(No Model.)

J. DAVIS.
PIPE COUPLING.

No. 381,913. Patented May 1, 1888.

Witnesses.
Wm. F. Tanner.
W. E. Stearns.

Inventor
John Davis.
By his Attorneys
Johnston, Reinohl & Dyre

N. PETERS, Photo-Lithographer, Washington, D. C.

UNITED STATES PATENT OFFICE.

JOHN DAVIS, OF ALLEGHENY, PENNSYLVANIA.

PIPE-COUPLING.

SPECIFICATION forming part of Letters Patent No. 381,913, dated May 1, 1888.

Application filed June 23, 1887. Serial No. 242,268. (No model.)

*To all whom it may concern:*

Be it known that I, JOHN DAVIS, a citizen of the United States, residing at Allegheny, in the county of Allegheny and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention relates to pipe-couplings, and has for its object the construction of a coupling in which the pressure of the fluid in the pipes is utilized to expand the packing.

The invention will be hereinafter described, and particularly pointed out in the claims.

Figure 1:
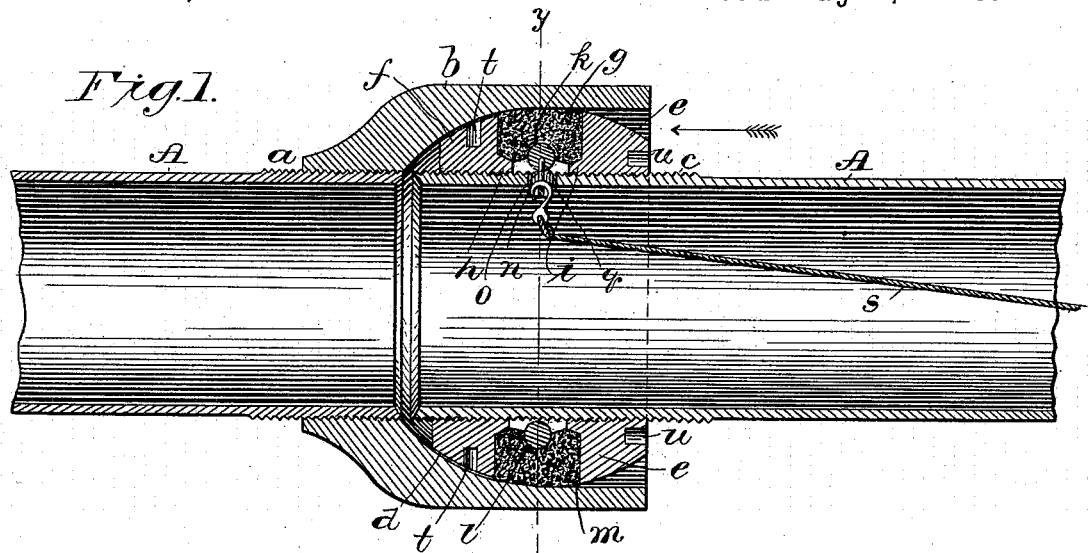
Figure 2:
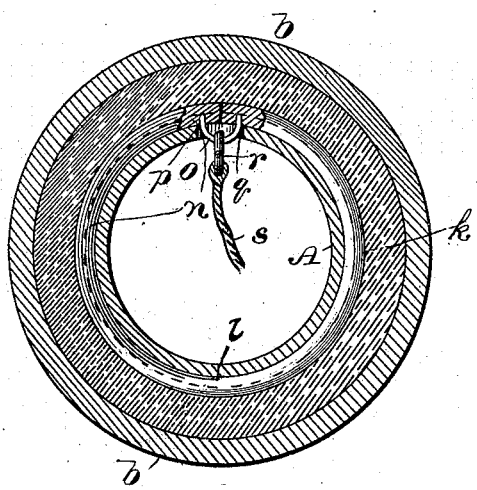
Figure 3:
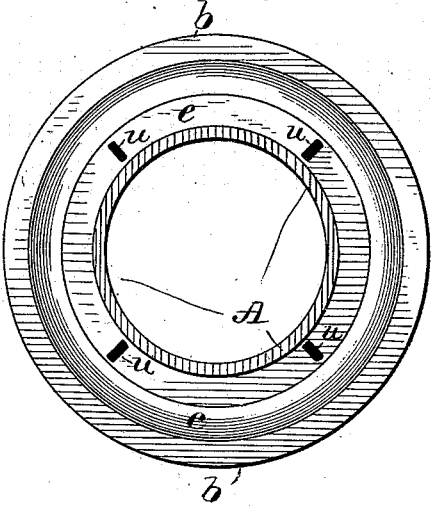
Figure 4:
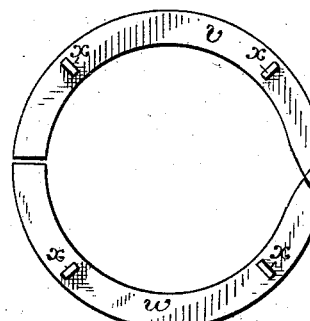

In the accompanying drawings, which form part of this specification, Figure 1 is a longitudinal section. Fig. 2 is a transverse section on the line $y\ y$ of Fig. 1. Fig. 3 is an end view looking in the direction of the arrow in Fig. 1, and Fig. 4 is a plan of a wrench used for compressing the packing.

Reference being had to the drawings and the letters marked thereon, A represents a pipe having an external screw-thread, $a$, at one end, to receive a bell-mouth, $b$, and a screw-thread, $c$, at the opposite end, to receive the annular nuts or clamping-rings $d\ e$. The inner end of the bell-mouth is concave at $f$, and the curved line extends out about half of the depth of the chamber in the bell-mouth, when the curved line gradually vanishes into a straight line, forming parallel walls, as at $g$. The bell-mouth may be formed integral with the body of the pipe, if desired.

On the spigot end of the pipe is an annular nut or clamping-ring, $d$, provided with a lateral projection, $h$, and in the rear of said ring is a similar ring, $e$, also provided with a lateral projection, $i$. The outer surfaces of the rings $d$ and $e$ are curved, as shown, to admit of changes or variations in the alignment of the pipes. Between the rings $d$ and $e$ is formed a chamber to receive the flexible packing $k$, made of rubber or other elastic material. On the inner surface of the packing $k$ is a metal spring, $l$, which may be partly embedded in the packing, and serves to expand the packing-ring $k$ and force it out against the inner surface of the bell-mouth. The projections $h$ $i$ and the inner surface of the ring $k$ form a chamber, $m$, to which the fluid is admitted through an aperture, $n$, in the pipe between the two rings $d\ e$. The spring $l$ may be made a little longer than the circumference of the inner surface of the ring $k$, and the ends of the spring lapped when it is applied to the pipe; or it may be made a little larger in diameter than the internal diameter of the ring $k$, and a piece cut out to enable it to be compressed until the packing has been properly applied in forming the joint or coupling. In Figs. 1 and 2 I have illustrated the latter form of spring, and in which the ends of the spring are secured by a piece of wire, $o$, in the form of the letter U. The ends of the wire enter holes $p\ q$ in the spring, and hold the spring compressed until the joint has been made, when the wire is withdrawn through the aperture $n$ by means of a hook, $r$, and a cord, $s$, the resiliency of the spring $l$ forcing the packing-ring out to its seat when there is no fluid in the pipes, or fluid under light pressure, and preventing any leakage in the latter case. The ring $d$ is provided with holes $t$ in its periphery for securing it in place, and the ring $e$ with recesses $u$ in its outer end.

B represents a pair of tongs, from the one side of the jaws $v\ w$ of which project prongs $x\ x$ $x\ x$, which are adapted to the recesses $u$ in the ring $e$. The tongs span the pipe A, and the prongs $x$ enter the recesses $u$, when the ring $e$ may be screwed toward the ring $d$ and the elastic packing further expanded outward by lateral compression.

The joint or coupling is made as follows: The bell-mouth $b$ is screwed on the thread $a$. The ring $e$ is screwed on the thread $c$ beyond the aperture $n$. The packing-ring $k$ is then put into position, with the ends of the spring $l$ held by the wire loop $o$, and the hook $r$ and cord $s$ attached; or they may be attached later in the operation. The ring $d$ is then applied and screwed back until it reaches the packing-ring $k$. The projections $h\ i$ being under the packing-ring $k$, its inner surface cannot touch the pipe, thus insuring space between the inner surface of the ring and the outer surface of the pipe to form a chamber to receive the fluid from the pipe. The spigot end of the pipe, with the packing affixed, is then inserted into the bell until the outer curved surface of the ring $d$ bears against the inner curved surface of the bell, when the spring $l$ is released by pulling the cord $s$ and the ring $e$ screwed up toward the ring $d$, and the packing-ring $k$ fully expanded until a perfectly-tight joint is formed. The curved surfaces on the exterior of the rings $d$ and $e$ and the curved and straight surfaces of the inner surface of the bell accommodate any changes in alignment without subjecting the joint to leakage.

It will be observed that in my joint three forces are employed to keep the packing-ring expanded—first, the resiliency of the spring $l$; second, the lateral pressure applied by the ring $e$, and, third, the pressure of the fluid contained in the pipes.

My invention is admirably adapted to mains or conduits carrying fluid under high pressure—such as water, compressed air, gas, or any other fluid.

Having thus fully described my invention, what I claim is—

1. In a pipe-coupling, the spigot end of a pipe having a screw-thread thereon, movable metallic rings curved in cross-section on their outer surfaces, an elastic and laterally compressible packing, and a fluid-chamber between said rings and an aperture communicating with said chamber, in combination with the bell of an adjacent pipe having a curved surface at the inner end of the bell, whereby the packing is expanded by lateral compression and the pressure of the fluid in the pipe and deviations in the alignment provided for, substantially as described.

2. In a pipe-coupling, the spigot end of a pipe having detachable metallic rings curved in cross-section on their outer surfaces, an elastic packing, a spring and a fluid-chamber between said rings, and an aperture in the pipe communicating with said chamber, in combination with the bell end of an adjacent pipe, the inner wall of which is composed of curved and parallel surfaces, substantially as described.

In testimony whereof I affix my signature in presence of two witnesses.

JOHN DAVIS.

Witnesses:
W. H. STERRITT,
THOS. M. TATEM.